US008824426B2

(12) United States Patent
Wang et al.

(10) Patent No.: US 8,824,426 B2
(45) Date of Patent: Sep. 2, 2014

(54) METHOD FOR TRANSMITTING PHYSICAL DOWNLINK CONTROL CHANNEL (PDCCH) INFORMATION, METHOD FOR DETERMINING PDCCH SEARCH SPACE AND DEVICES THEREOF

(75) Inventors: Jun Wang, Beijing (CN); Xiaodong Xu, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 211 days.

(21) Appl. No.: 13/501,549

(22) PCT Filed: Oct. 12, 2010

(86) PCT No.: PCT/CN2010/001598
§ 371 (c)(1),
(2), (4) Date: Apr. 12, 2012

(87) PCT Pub. No.: WO2011/044755
PCT Pub. Date: Apr. 21, 2011

(65) Prior Publication Data
US 2012/0201230 A1    Aug. 9, 2012

(30) Foreign Application Priority Data

Oct. 12, 2009  (CN) .......................... 2009 1 0093533
Aug. 20, 2010  (CN) .......................... 2010 1 0258743

(51) Int. Cl.
| H04J 3/00 | (2006.01) |
| H04L 5/00 | (2006.01) |
| H04W 48/08 | (2009.01) |
| H04W 72/04 | (2009.01) |
| H04W 24/00 | (2009.01) |

(52) U.S. Cl.
CPC ............. *H04W 48/08* (2013.01); *H04L 5/0007* (2013.01); *H04W 72/042* (2013.01); *H04L 5/0053* (2013.01); *H04L 5/001* (2013.01); *H04W 24/00* (2013.01)
USPC ............................ 370/336; 370/329; 455/421

(58) Field of Classification Search
CPC ......... H04L 5/001; H04L 5/00; H04L 5/0007; H04W 72/042
USPC ......... 370/336, 216, 329, 328; 455/422.1, 68, 455/67.11, 91; 375/295
See application file for complete search history.

(56) References Cited

U.S. PATENT DOCUMENTS

2009/0209247 A1*  8/2009  Lee et al. ................... 455/422.1
2011/0070845 A1*  3/2011  Chen et al. ....................... 455/91

FOREIGN PATENT DOCUMENTS

WO         2009-057283         5/2009

OTHER PUBLICATIONS

R2-103849, "CIF Inclusion in PDCCH order", Fujitsu, 3GPP TSG-RAN WG2 Meeting #70bis, Jun. 28-Jul. 2, 2010, p. 1.
R1-093699, "Way Forward on PDCCH for bandwidth extension in LTE-A", Alcatel-Lucent et al., 3GPP TSG RAN WG1 Meeting #58, Aug. 24-28, 2009, p. 2.
International Search Report cited in PCT/CN2010/001598, dated Jan. 20, 2011.

* cited by examiner

*Primary Examiner* — Charles C Jiang
*Assistant Examiner* — Walli Butt
(74) *Attorney, Agent, or Firm* — Workman Nydegger

(57) ABSTRACT

A method for transmitting Physical Downlink Control Channel (PDCCH) information, a method for determining PDCCH search space and devices thereof are disclosed in the present embodiments. The method for determining PDCCH search space includes the following step: Node B (NB) determines the different search spaces corresponding to different PDCCHs according to Carrier Indicator (CI) information. By applying the technical solution provided in the embodiments of the present invention, the CI information is introduced in the search space determining process, so that different search spaces can be allocated to the cross-carrier PDCCHs of one User Equipment (UE) and the NB and UE are able to exactly determine the search spaces of PDCCHs in each downlink carrier, therefore reducing the blocking probability during PDCCH scheduling process and improving the reliability of PDCCH transmission.

11 Claims, 4 Drawing Sheets

METHOD FOR TRANSMITTING PHYSICAL DOWNLINK CONTROL CHANNEL (PDCCH) INFORMATION, METHOD FOR DETERMINING PDCCH SEARCH SPACE AND DEVICES THEREOF

The present application is a US National Stage of International Application No. PCT/CN2010/001598, filed 12 Oct. 2010, designating the United States, and claiming priorities to Chinese Patent Application No. 200910093533.8 filed 12 Oct. 2009 and Chinese Patent Application No. 201010258743.0 filed 20 Aug. 2010. All of the aforementioned applications are incorporated herein in their entirety.

FIELD OF THE INVENTION

The present invention relates to the field of communications and particularly to a method for transmitting PDCCH information and a method for determining a search space of a PDCCH and devices thereof.

BACKGROUND OF THE INVENTION

The scheme of Option 1B reserved in the design of a Physical Downlink Control Channel (PDCCH) with carrier aggregation has such a core idea that the PDCCH can indicate across-carrier resource assignment. For example, PDCCHs indicating resource assignment information over a carrier 1, a carrier 2 and a carrier 3 to a User Equipment (UE) are transmitted over the carrier 2, and a correspondence relationship between the PDCCHs and the carriers is explicitly indicated in a Carrier Indicator (CI, a typical CI generally includes 1 to 3 bits). FIG. 1 illustrates a schematic diagram of an across-carrier PDCCH.

When a plurality of PDCCHs belonging to the same UE are transmitted over one carrier, the definition of their search space will be an issue to be analyzed. Based on a definition of a PDCCH search space of Rel-8, information on Control Channel Elements (CCEs) occupied by the PDCCHs can be determined in the following formula, where a CCE resource occupied by the $m^{th}$ PDCCH candidate is as follows.

Positional information of a search space can be determined in the following formula:

$$L \cdot \{(Y_k+m) \bmod \lfloor N_{CCE,k}/L \rfloor\}+i,$$

Where i=0, 1, ..., L−1,
m=0, 1, ..., $M^L$−1,
L represents an Aggregation Level (AL), and
$M^L$ represents the size of a search space corresponding to the aggregation level L.

Furthermore, $Y_k$ represents a parameter characterizing the starting position of a PDCCH search space of a UE k, and the value of the starting position of the PDCCH search space of the UE k at a varying aggregation level L can be determined according to the parameter, where the parameter is determined in the following formula:

$$Y_k=(A \cdot Y_{k-1}) \bmod D$$

Correspondingly, $Y_{-1}=n_{RNTI} \neq 0$,
A=39827,
D=65537,
k=$\lfloor n_s/2 \rfloor$, and
$n_s$ represents the number of a timeslot in a radio frame.

With regard to the existing technical solution, the inventors have identified during making of the invention at least the following problems in the existing technical solution.

If the number of PDCCHs belonging to a user equipment exceeds the number of currently available spaces in a search space, those excessive PDCCHs will be blocked.

For example, a specific UE is configured to receive data over three carriers numbered 1, 2 and 3, and all the PDCCHs corresponding to the three carriers are transmitted over the carrier 2 (i.e., the PDCCH Option 1B is adopted); and also if an eNB has to transmit data to the UE in a specific radio frame concurrently over the three carriers, the eNB has to transmit the three PDCCHs to the UE over the carrier 2.

If the aggregation level used for the UE is 1, the size of its corresponding search space is six CCEs, i.e., the six consecutive resource spaces (corresponding to six consecutive CCEs) as illustrated in FIG. 2, and one PDCCH is borne in each CCE.

In a PDCCH scheduling mode of Rel-8, the eNB will search the CCEs 0 to 5 for three available CCEs to be allocated to the three PDCCHs of the UE, but there are only two available CCEs in the search space, so not all the PDCCHs can have a corresponding CCE allocated thereto, and there will necessarily be one PDCCH for which no idle resource can be found, that is, this PDCCH will be blocked.

SUMMARY OF THE INVENTION

Embodiments of the invention provide a method for transmitting PDCCH information, a method for determining a search space of a PDCCH and devices thereof in order to lower the probability of blocking an across-carrier PDCCH being scheduled.

To attain the foregoing object, there is provided in an aspect according to an embodiment of the invention a method for transmitting PDCCH information, which includes:

determining, by a base station, different search spaces corresponding to different PDCCHs according to Carrier Indicator, CI, information; and transmitting, by the base station, the different PDCCHs to a corresponding user equipment in the corresponding search spaces.

Preferably, determining by the base station the different search spaces corresponding to the different PDCCHs according to the CI information includes:

determining, by the base station, the CI information; and determining, by the base station, the different search spaces corresponding to the different PDCCHs according to the CI information.

Preferably, determining by the base station the CI information includes:

determining, by the base station, the CI information according to information in a Downlink Control Information (DCI) field.

Preferably, determining by the base station the different search spaces corresponding to the different PDCCHs according to the CI information includes:

determining, by the base station, starting parameters of the search spaces corresponding to the respective PDCCHs according to the CI information of the respective PDCCHs; and determining, by the base station, Control Channel Element (CCE) information according to the starting parameters of the search spaces.

Preferably, the base station determines the starting parameters of the search spaces corresponding to the respective PDCCHs according to the CI information of the respective PDCCHs in the formula of:

$$Y_k=(A(Y_{k-1}+p^*n_{CI})) \bmod D,$$

wherein $Y_k$ represents the starting parameters of the search spaces corresponding to the respective PDCCHs, $n_{CI}$ represents a decimal numerical value corresponding to the CI information, p represents an integer which is set in a system, $Y_{-1} = n_{RNTI} \neq 0$,

A=39827,

D=65537, $k = \lfloor n_s/2 \rfloor$, and $n_s$ represents the number of a timeslot in a radio frame.

Preferably, determining by the base station the different search spaces corresponding to the different PDCCHs according to the CI information includes:

determining, by the base station, starting parameters of the search spaces corresponding to the respective PDCCHs; and determining, by the base station, CCE information corresponding to the respective PDCCHs according to the CI information and the starting parameters of the search spaces of the respective PDCCHs.

Preferably, the base station determines the CCE information corresponding to the respective PDCCHs according to the CI information and the starting parameters of the search spaces of the respective PDCCHs in the formula of:

$$L \cdot \{(Y_k + p^* n_{CI} + m) \bmod \lfloor N_{CCE,k}/L \rfloor\} + i,$$

wherein $Y_k$ represents the starting parameters of the search spaces corresponding to the respective PDCCHs, $n_{CI}$ represents a decimal numerical value corresponding to the CI information, p represents an integer which is set in a system, i=0, 1, ..., L−1, m=0, 1, ..., $M^L$−1, L represents an aggregation level, and $M^L$ represents the size of a search space corresponding to the aggregation level L.

Preferably, determining by the base station the different search spaces corresponding to the different PDCCHs according to the CI information includes:

determining, by the base station, starting parameters of the search spaces corresponding to the respective PDCCHs; and determining, by the base station, CCE information corresponding to the respective PDCCHs according to the CI information and the starting parameters of the search spaces of the respective PDCCHs.

Preferably, the base station determines the starting parameters of the search spaces corresponding to the respective PDCCHs according to the CI information of the respective PDCCHs in the formula of:

$$Y_k = (A(Y_{k-1} + p^* n_{CI})) \bmod D,$$

wherein $Y_k$ represents the starting parameters of the search spaces corresponding to the respective PDCCHs, $n_{CI}$ represents a decimal numerical value corresponding to the CI information, p represents an integer which is set in a system, $Y_{-1} = n_{RNTI} \neq 0$,

A=39827,

D=65537, $k = \lfloor n_s/2 \rfloor$, and $n_s$ represents the number of a timeslot in a radio frame; and the base station determines the CCE information corresponding to the respective PDCCHs according to the CI information and the starting parameters of the search spaces of the respective PDCCHs in the formula of:

$$L \cdot \{(Y_k + p^* n_{CI} + m) \bmod \lfloor N_{CCE,k}/L \rfloor\} + i,$$

wherein $Y_k$ represents the starting parameters of the search spaces corresponding to the respective PDCCHs, $n_{CI}$ represents a decimal numerical value corresponding to the CI information, p represents an integer which is set in a system, i=0, 1, ..., L−1, m=0, 1, ..., $M^L$−1, L represents an aggregation level, and $M^L$ represents the size of a search space corresponding to the aggregation level L.

Preferably, the method further includes: before the base station determines the different search spaces corresponding to the different PDCCHs according to the CI information, quantifying, by the base station, the CI information.

In another aspect, an embodiment of the invention further provides a method for determining a search space of a PDCCH, which includes:

determining, by a base station, Carrier Indicator (CI) information; and determining, by the base station, different search spaces corresponding to different PDCCHs according to the CI information.

Preferably, determining by the base station the CI information includes:

determining, by the base station, the CI information according to information in a Downlink Control Information (DCI) field.

Preferably, determining by the base station the different search spaces corresponding to the different PDCCHs according to the CI information includes:

determining, by the base station, starting parameters of the search spaces corresponding to the respective PDCCHs according to the CI information of the respective PDCCHs; and determining, by the base station, Control Channel Element (CCE) information according to the starting parameters of the search spaces.

Preferably, the base station determines the starting parameters of the search spaces corresponding to the respective PDCCHs according to the CI information of the respective PDCCHs in the formula of:

$$Y_k = (A(Y_{k-1} + p^* n_{CI})) \bmod D,$$

wherein $Y_k$ represents the starting parameters of the search spaces corresponding to the respective PDCCHs, $n_{CI}$ represents a decimal numerical value corresponding to the CI information, p represents an integer which is set in a system, $Y_{-1} = n_{RNTI} \neq 0$,

A=39827,

D=65537, $k = \lfloor n_s/2 \rfloor$, and $n_s$ represents the number of a timeslot in a radio frame.

Preferably, determining by the base station the different search spaces corresponding to the different PDCCHs according to the CI information includes:

determining, by the base station, starting parameters of the search spaces corresponding to the respective PDCCHs; and determining, by the base station, CCE information corresponding to the respective PDCCHs according to the CI information and the starting parameters of the search spaces of the respective PDCCHs.

Preferably, the base station determines the CCE information corresponding to the respective PDCCHs according to the CI information and the starting parameters of the search spaces of the respective PDCCHs in the formula of:

$$L \cdot \{(Y_k + p^* n_{CI} + m) \bmod \lfloor N_{CCE,k}/L \rfloor\} + i,$$

wherein $Y_k$ represents the starting parameters of the search spaces corresponding to the respective PDCCHs, $n_{CI}$ represents a decimal numerical value corresponding to the CI information, p represents an integer which is set in a system, i=0, 1, . . . , L−1, m=0, 1, . . . , $M^L$−1, L represents an aggregation level, and $M^L$ represents the size of a search space corresponding to the aggregation level L.

Preferably, determining by the base station the different search spaces corresponding to the different PDCCHs according to the CI information includes:

determining, by the base station, starting parameters of the search spaces corresponding to the respective PDCCHs according to the CI information of the respective PDCCHs; and determining, by the base station, CCE information corresponding to the respective PDCCHs according to the CI information and the starting parameters of the search spaces of the respective PDCCHs.

Preferably, the base station determines the starting parameters of the search spaces corresponding to the respective PDCCHs according to the CI information of the respective PDCCHs in the formula of:

$$Y_k = (A(Y_{k-1} + p^* n_{CI})) \bmod D,$$

wherein $Y_k$ represents the starting parameters of the search spaces corresponding to the respective PDCCHs, $n_{CI}$ represents a decimal numerical value corresponding to the CI information, p represents an integer which is set in a system, $Y_{-1} = n_{RNTI} \neq 0$,

A=39827,

D=65537, k=$\lfloor n_s/2 \rfloor$, and $n_s$ represents the number of a timeslot in a radio frame; and the base station determines the CCE information corresponding to the respective PDCCHs according to the CI information and the starting parameters of the search spaces of the respective PDCCHs in the formula of:

$$L \cdot \{(Y_k + p^* n_{CI} + m) \bmod \lfloor N_{CCE,k}/L \rfloor\} + i,$$

wherein $Y_k$ represents the starting parameters of the search spaces corresponding to the respective PDCCHs, $n_{CI}$ represents a decimal numerical value corresponding to the CI information, p represents an integer which is set in a system, i=0, 1, . . . , L−1, m=0, 1, . . . , $M^L$−1, L represents an aggregation level, and $M^L$ represents the size of a search space corresponding to the aggregation level L.

Preferably, the method further includes: before the base station determines the different search spaces corresponding to the different PDCCHs according to the CI information, quantifying, by the base station, the CI information.

Preferably, the method further includes: after the base station determines the different search spaces corresponding to the different PDCCHs according to the CI information, transmitting, by the base station, the different PDCCHs to a corresponding user equipment in the corresponding search spaces.

In another aspect, an embodiment of the invention further provides a base station including:

a first determining module configured to determine Carrier Indicator (CI) information; and a second determining module connected with the first determining module and configured to determine different search spaces corresponding to different Physical Downlink Control Channels (PDCCHs) according to the CI information determined by the first determining module.

Preferably, the first determining module is further configured to determine the CI information according to information in a Downlink Control Information (DCI) field.

Preferably, the second determining module includes:

a parameter determining sub-module configured to determine starting parameters of the search spaces corresponding to the respective PDCCHs according to the CI information of the respective PDCCHs; and an information determining sub-module connected with the parameter determining sub-module and configured to determine CCE information according to the starting parameters of the search spaces determined by the parameter determining sub-module.

Preferably, the second determining module includes:

a parameter determining sub-module configured to determine starting parameters of the search spaces; and an information determining sub-module connected with the parameter determining sub-module and configured to determine CCE information corresponding to the respective PDCCHs according to the CI information of the respective PDCCHs and the starting parameters of the search spaces determined by the parameter determining sub-module.

Preferably, the second determining module includes:

a parameter determining sub-module configured to determine starting parameters of the search spaces corresponding to the respective PDCCHs according to the CI information of the respective PDCCHs; and an information determining sub-module connected with the parameter determining sub-module and configured to determine CCE information corresponding to the respective PDCCHs according to the CI information of the respective PDCCHs and the starting parameters of the search spaces determined by the parameter determining sub-module.

Preferably, the second determining module further includes:

a quantifying sub-module configured to quantify the CI information determined by the first determining module.

Preferably, the base station further includes:

a transmitting module connected with the second determining module and configured to transmit the different PDCCHs to a corresponding user equipment in the different search spaces determined by the second determining module.

In another aspect, an embodiment of the invention further provides a method for determining a search space of a PDCCH, which includes:

determining, by a user equipment, search spaces of PDCCHs over respective received downlink carriers according to $n_{CI}$ information in preset information and a strategy applied at the network side to determine different search spaces corresponding to different PDCCHs.

Preferably, the method further includes: after determining by the user equipment the search spaces of the PDCCHs over the respective received downlink carriers according to the $n_{CI}$ information in the preset information and the strategy applied at the network side to determine the different search spaces corresponding to the different PDCCHs, receiving, by the user equipment, PDCCHs corresponding to the user equipment in the respective determined search spaces.

Preferably, receiving by the user equipment the PDCCHs corresponding to the user equipment in the respective determined search spaces includes:

acquiring, by the user equipment, a PDCCH in each of the determined search spaces and judging whether Carrier Indicator (CI) information included over the PDCCH is consistent with the $n_{CI}$ information in the preset information; and if so, receiving, by the user equipment, the PDCCH in the corresponding search space according to the CI information; otherwise, continuing, by the user equipment, with acquiring another PDCCH and judging whether CI information included over the another PDCCH is consistent with the $n_{CI}$ information in the preset information until judgment is made for all the PDCCHs in the respective search spaces over the respective downlink carriers.

In another aspect, an embodiment of the invention further provides a user equipment including:

a configuring module configured to configure preset information including at least $n_{CI}$ information according to information transmitted from the network side; and a determining module configured to determine search spaces of Physical Downlink Control Channels (PDCCHs) over respective received downlink carriers according to the $n_{CI}$ information in the preset information configured by the configuring module and a strategy applied at the network side to determine different search spaces corresponding to different PDCCHs.

Preferably, the user equipment further includes:

a receiving module configured to receive PDCCHs corresponding to the user equipment in the respective search spaces determined by the determining module.

Preferably, the user equipment further includes:

a judging module configured to acquire a PDCCH in each of the search spaces determined by the determining module and judge whether Carrier Indicator (CI) information included over the PDCCH is consistent with the $n_{CI}$ information in the preset information configured by the configuring module, and if not, continue with judging whether CI information included over another PDCCH is consistent with the $n_{CI}$ information in the preset information configured by the configuring module until judgment is made for all the PDCCHs in the respective search spaces over the respective downlink carriers; and the receiving module is further configured to receive the PDCCH in the corresponding search space according to the CI information when the result of judgment by the judging module shows consistency.

The embodiments of the invention have the following advantages over the prior art.

With the technical solutions according to the embodiments of the invention, CI information is introduced in determining a search space so that different search spaces can be allocated to across-carrier PDCCHs of a user equipment to enable a base station and the user equipment to determine accurately the search spaces of the PDCCHs over respective downlink carriers, thereby lowering the probability of blocking a PDCCH being scheduled and improving the reliability of transmitting the PDCCH.

DETAILED DESCRIPTIONS OF THE EMBODIMENTS

The technical solutions in the embodiments of the invention will be described clearly and fully below with reference to the drawings in the embodiments of the invention, and apparently the described embodiments are merely a part but not all of the embodiments of the invention. Any other embodiments that can occur to those ordinarily skilled in the art benefiting from the described embodiments of the invention but without any inventive effort shall come into the scope of the invention.

As introduced in the Background of the Invention, the probability of being blocked in transmission will be increased in the existing method for determining a search space when a plurality of across-carrier PDCCHs belonging to a user equipment are placed over one carrier for transmission.

The across-carrier PDCCHs refer to PDCCHs belonging to a user equipment and intended for across-carrier scheduling and include a PDCCH for intra-carrier scheduling and PDCCHs for other carrier scheduling.

In order to address the drawback in the prior art, an embodiment of the invention provides a method for determining a search space, which is applicable in a system where indicator information of a plurality of PDCCHs belonging to the same user equipment is transmitted over the same carrier, where CI information is introduced to set a search space of across-carrier PDCCHs so that search spaces of across-carrier indicated PDCCHs can be set separately and the user equipment can be instructed to acquire a PDCCH in a corresponding search space.

Such a technical solution is implemented based upon the design scheme of across-carrier PDCCHs for which a CI field (typically including 1 to 3 bits) is added to the original Downlink Control Information (DCI) field of Rel-8 to indicate a relationship between the across-carrier PDCCHs and carriers.

An embodiment of the invention provides a method for transmitting PDCCH information, a process flow of which is as follows.

Firstly a base station determines different search spaces corresponding to different PDCCHs according to CI information, and then the base station transmits the different PDCCHs to a corresponding user equipment in the corresponding search spaces.

The base station may determine the different search spaces corresponding to the different PDCCHs according to the CI information in the following process (but not limited thereto):

the base station firstly determines the CI information and then determines the different search spaces corresponding to the different PDCCHs according to the determined CI information.

The base station may determine the CI information according to information in a DCI field (but not limited thereto).

A specific implementation will be given below.

Figure 1:
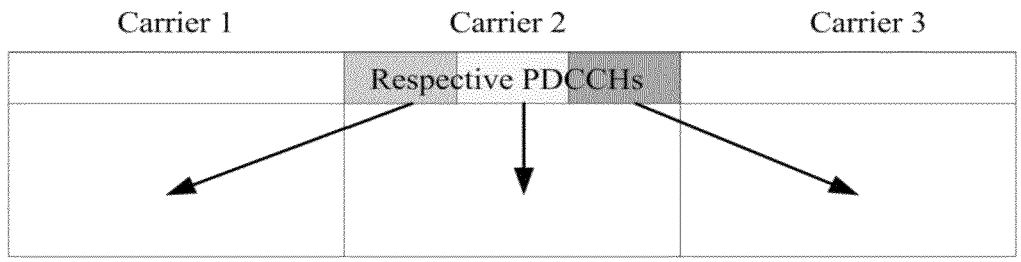
FIG. 1 is a schematic diagram of an across-carrier PDCCH in the prior art.
Figure 2:
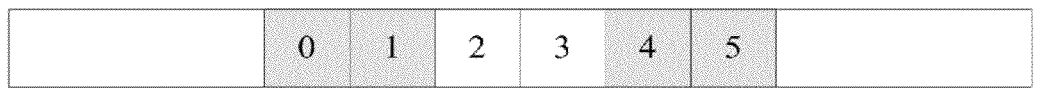
FIG. 2 is a schematic diagram of a search space in the prior art.
Figure 3:
FIG. 3 is a schematic structural diagram of a DCI in the Option 1B in the prior art.
Figure 4:
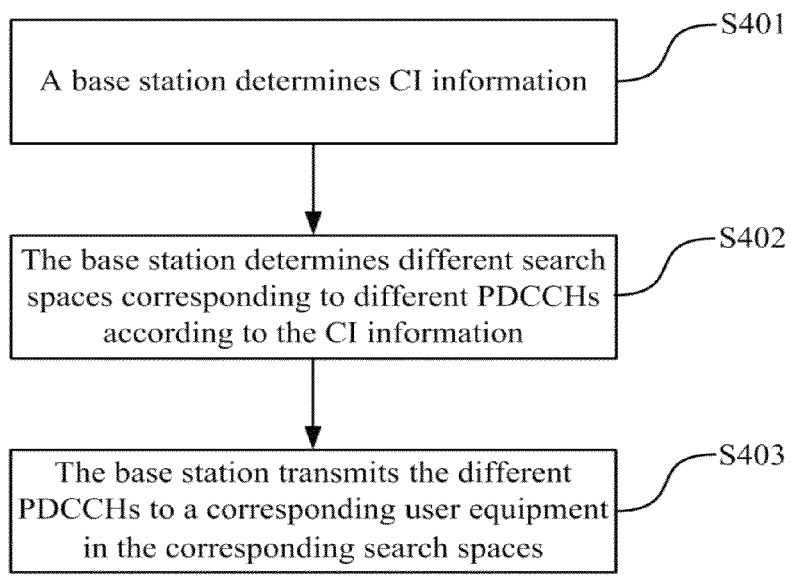
FIG. 4 is a schematic flow chart of a method for transmitting PDCCH information according to an embodiment of the invention.

As illustrated in FIG. 4, a method for transmitting PDCCH information according to an embodiment of the invention includes the following operations.

Operation S401. A base station determines CI information.

In a practical application, the base station may determine the CI information according to information in a DCI field.

Operation S402. The base station determines different search spaces corresponding to different PDCCHs according to the CI information.

A search space is determined in two operations: firstly a starting parameter $Y_k$ of the search space is determined, and a specific value of the starting position of the search space can be determined in a corresponding method after the parameter is determined, and then CCE information is further determined to thereby determine the search space.

In a specific application scenario, the different search spaces corresponding to the different PDCCHs are determined in one of the following three schemes.

In a first scheme, the CI information is introduced in determining the starting parameters of the search spaces corresponding to the respective PDCCHs to thereby determine the different search spaces.

The base station determines the starting parameters of the search spaces corresponding to the respective PDCCHs according to the CI information of the respective PDCCHs; and the base station determines the corresponding CCE information according to the starting parameters of the search spaces.

With this scheme, firstly the CI information is introduced in determining the starting parameters of the search spaces and the starting parameters of the search spaces corresponding to the respective PDCCHs are determined according to the CI information of the respective PDCCHs, and then the corresponding CCE information is determined according to the starting parameters of the search spaces determined according to the CI information, thereby determining the different search spaces corresponding to the different PDCCH according to the CI information.

In a second scheme, the CI information is introduced in determining the CCE information corresponding to the respective PDCCHs to thereby determine the different search spaces.

The base station determines the starting parameters of the search spaces corresponding to the respective PDCCHs; and the base station determines the CCE information corresponding to the respective PDCCHs according to the CI information and the starting parameters of the search spaces of the respective PDCCHs.

With this scheme, the starting parameters of the search spaces still are determined as in the prior art, and after the starting parameters of the search spaces are determined, the CI information is introduced in subsequently determining the CCE information, thereby determining the different search spaces corresponding to the different PDCCHs according to the CI information.

In a third scheme, the CI information is introduced in determining both the starting parameters of the search spaces and the CCE information corresponding to the respective PDCCHs to thereby determine the different search spaces.

The base station determines the starting parameters of the search spaces corresponding to the respective PDCCHs according to the CI information of the respective PDCCHs; and the base station determines the CCE information corresponding to the respective PDCCHs according to the CI information and the starting parameters of the search spaces of the respective PDCCHs.

With this scheme, the CI information is introduced in determining the starting parameters of the search spaces to thereby determine the starting parameters of the search spaces corresponding to the respective PDCCHs according to the CI information of the respective PDCCHs, and the CI information is introduced also in subsequently determining the CCE information to thereby determine the corresponding CCE information according to the CI information and the starting parameters of the search spaces determined according to the CI information, thus determining the different search spaces corresponding to the different PDCCHs according to the CI information.

It shall be noted that the CI information is quantified before each of the foregoing three schemes is performed in a specific application scenario so that the quantified CI information can be applied in the determination process.

Operation S403. The base station transmits the different PDCCHs to a corresponding user equipment in the corresponding search spaces.

The foregoing technical flow is an implementation flow at the base station side or the network side, and the technical solution according to an embodiment of the invention at the UE side will be further described below.

Figure 5:
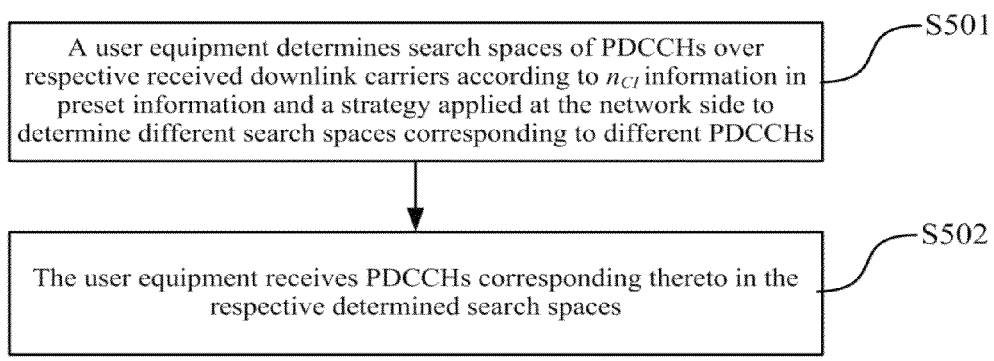
FIG. 5 is a schematic flow chart of a method for receiving PDCCH information according to an embodiment of the invention.

As illustrated in FIG. 5, a method for receiving PDCCH information according to an embodiment of the invention includes the following operations.

Operation 501. A user equipment determines search spaces of PDCCHs over respective received downlink carriers according to $n_{CI}$ information in preset information and a strategy applied at the network side to determine the different search spaces corresponding to the different PDCCHs.

Before this operation, the user equipment may acquire the $n_{CI}$ information corresponding to the respective downlink carriers from the preset information and determines the respective search spaces over the downlink carriers according to the $n_{CI}$ information to facilitate a subsequent operation.

In a specific application scenario, the preset information is information with which the user equipment is configured directly from the network side and which may include $n_{CI}$ ($n_{CI}$ refers to the number of a carrier configured from the network side for the user equipment to receive, $\{n_{CI}\}$ is the maximum set of the numbers of carriers configured from the network side for the user equipment to receive), $n_{RNTI}$ and $n_s$.

Furthermore, in order to determine the search spaces, the user equipment shall further know the strategy applied at the network side to determine the different search spaces corresponding to the different PDCCHs and thus can determine the corresponding search spaces according to the $n_{CI}$ information as per the strategy. In this process, the strategy can be acquired either by being set uniformly in a system or from information interaction without departing from the scope of the invention.

In order to avoid being blocked due to transmission of the PDCCHs in the same resource placement space, the PDCCHs are transmitted to the user equipment from the network side in different resource placement space, and since different available resources are present respectively in the different resource placement spaces, a different available space among the different resource placement spaces can be allocated to each PDCCH to thereby avoid being blocked.

Since the across-carrier PDCCHs corresponding to the user equipment are distributed in the different search spaces, the user equipment shall detect the respective search spaces over the downlink carriers to thereby locate the PDCCHs carried therein, and the user equipment initially has no knowledge of the positions of the search spaces over the downlink carriers and therefore shall determine the positions of the search spaces over the downlink carriers according to the $n_{CI}$ information.

Operation S502. The user equipment receives PDCCHs corresponding thereto in the respective determined search spaces.

In a specific application scenario, the user equipment shall receive a PDCCH by judging whether it is a PDCCH corresponding thereto, and such judgment can be made as follows.

The user equipment acquires CI information corresponding thereto by comparing CI information included over an acquired PDCCH with the $n_{CI}$ information in the preset information for consistency, and acquires a corresponding PDCCH according to the CI information.

As described above, the user equipment acquires the PDCCH in each of the determined search spaces and judges whether the CI information included over the PDCCH is consistent with the $n_{CI}$ information in the preset information.

If so, the user equipment receives the PDCCH in the corresponding search space according to the CI information; otherwise, the user equipment continues with judging whether CI information included over another PDCCH is consistent with the $n_{CI}$ information in the preset information until judgment is made for all the PDCCHs over the respective search spaces over the respective downlink carriers.

Since the PDCCHs belonging to the same user equipment may be located in the different resource placement spaces, corresponding indicator information will be transmitted from the network side to the user equipment so that the user equipment is notified implicitly of the resource placement spaces where the different PDCCHs are located and acquires the different PDCCHs in the corresponding search spaces, and such information is indicated in the CI information, and in a specific application scenario, the CI information can be carried in DCI information to be transmitted to the user equipment.

It shall be noted that the CI information can alternatively be carried in another message or other information to be transmitted to the user equipment if the same indication effect can be attained, and a specific transmission form can be modified without departing from the scope of the invention.

The user equipment acquires firstly a PDCCH and then the CI information included over the PDCCH, compares the CI information with a relevant parameter in the preset information and judges whether both of them are consistent.

For example, a value corresponding to the CI information is compared with $n_{CI}$ in the preset information, and it is judged whether they are consistent.

When the result of judgment shows consistency, the user equipment determines the CI information as the CI information corresponding thereto.

In this case, the PDCCH included in the determined search space is a PDCCH corresponding to the user equipment, which can be acquired directly by the user equipment.

When the result of judgment shows inconsistency, the user equipment continues with detecting another PDCCH until all the PDCCHs are detected.

In this case, the acquired PDCCH is not a PDCCH corresponding to the user equipment, and the user equipment shall continue with detection, and of course, if no correct search space can be located after all the PDCCHs are detected, no PDCCH can be acquired and search failure can be determined.

The embodiment of the invention has the following advantages over the prior art.

With the technical solution according to the embodiment of the invention, CI information is introduced in determining a search space so that different search spaces can be allocated to across-carrier PDCCHs of a user equipment to enable a base station and the user equipment to determine accurately the search spaces of the PDCCHs over respective downlink carriers, thereby lowering the probability of blocking a PDCCH being scheduled and improving the reliability of transmitting the PDCCH.

The technical solution according to the invention will be described clearly and fully below in embodiments of a specific application scenario, and apparently the described embodiments are merely a part but not all of the embodiments of the invention. Any other embodiments that can occur to those ordinarily skilled in the art benefiting from the described embodiments of the invention but without any inventive effort shall come into the scope of the invention.

In the technical solution according to an embodiment of the invention, a CI field is introduced in determining a search space of a PDCCH so that a plurality of across-carrier PDCCHs of the same UE are placed in different resource placement spaces as search spaces of the UE in which the corresponding PDCCHs are acquired to thereby lower the probability that a PDCCH is blocked.

Specifically, CI information can be introduced in determining a starting parameter $Y_k$ of a search space or in determining CCE information or both.

The technical solution according to the embodiment of the invention will be described now by way of an example in which CI information is introduced in determining a starting parameter $Y_k$ of a search space.

Firstly the original formula in which a starting parameter $Y_k$ of a search space is calculated is modified as follows:

$$Y_k = (A(Y_{k-1} + p * n_{CI})) \bmod D,$$

Where $n_{CI}$ represents a decimal numerical value corresponding to CI information,
p represents an integer which is set in a system,
$Y_{-1} = n_{RNTI} \neq 0$,
A=39827,
D=65537,
$k = \lfloor n_s/2 \rfloor$, and
$n_s$ represents the number of a timeslot in a radio frame.

A technical idea of the foregoing configuration lies in that in a specific application scenario there is a constant $n_{RNTI}$ for the same UE but there are different $n_{CI}$ corresponding to different across-carrier PDCCHs, so different $Y_k$ is calculated for each sub-frame in the foregoing modified formula in which the starting parameter $Y_k$ of the search space is calculated.

The calculated $Y_k$ is substituted into the formula of CCE information, and different values of search spaces can be derived to indicate that PDCCHs over different carriers will be placed into the different search spaces.

The foregoing calculation in the formulas can be analyzed as the following process in connection with a specific example.

Figure 6:
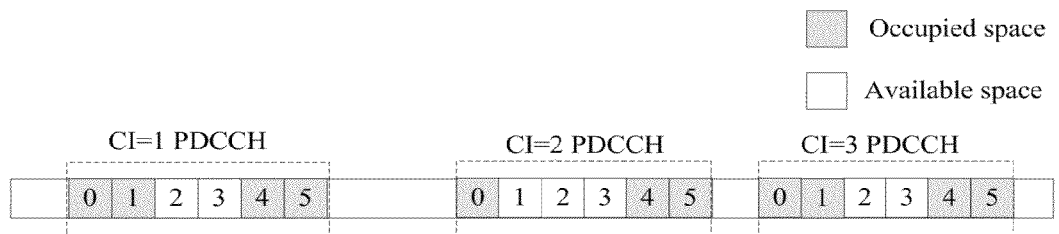
FIG. 6 is a schematic diagram of determining a separate space, in which a PDCCH resource is placed, based upon a CI in a specific application scenario according to an embodiment of the invention.

If a specific UE is configured to transmit data concurrently over three carriers, a specific radio sub-frame is required for three PDCCHs each at the aggregation level of 1, the respective PDCCHs will be allocated into separate search spaces, as illustrated in FIG. 6, in each of which there are six consecutive resource elements (six CCEs in total). In this way, a resource over which a PDCCH is transmitted can be located more easily, that is, the probability that the PDCCH is blocked can be lowered.

Similarly thereto, the technical solution according to the embodiment of the invention will be described by way of an example in which CI information is introduced in determining CCE information.

Firstly a starting parameter $Y_k$ of a search space can be determined by being directly calculated without any CI information as in the prior art or by being calculated in combination with CI information in the foregoing scheme or in any other scheme benefiting the technical idea of the invention, and a specific scheme in which a starting parameter $Y_k$ of a search space can be modified without departing from the scope of the present embodiment.

Then the original formula in which CCE information is calculated is modified as follows:

$$L \cdot \{(Y_k + p^* n_{CI} + m) \bmod \lfloor N_{CCE,k}/L \rfloor\} + i,$$

Where $n_{CI}$ represents a decimal numerical value corresponding to CI information, p represents an integer which is set in a system, i=0, 1, . . . , L−1, m=0, 1, . . . , $M^L$−1, L represents an aggregation level, and $M^L$ represents the size of a search space corresponding to the aggregation level L.

Finally the corresponding search space is determined according to the CCE information calculated in the foregoing formula, and a PDCCH is scheduled.

Furthermore in the technical solution according to the embodiment of the invention, the CI can be introduced in determining both a starting parameter $Y_k$ of a search space and CCE information, and there are numerous introduction schemes, none of which will be described here.

A specific introduction scheme will not be limited only to the introduction schemes given in the foregoing calculation formulas, and any introduction scheme in which such a technical effect can be attained that different PDCCHs are transmitted in different resource placement spaces will come into the scope of the invention.

The embodiment of the invention has the following advantages over the prior art.

With the technical solution according to the embodiment of the invention, CI information is introduced in determining a search space so that different search spaces can be allocated to across-carrier PDCCHs of a user equipment to enable a base station and the user equipment to determine accurately the search spaces of the PDCCHs over respective downlink carriers, thereby lowering the probability of blocking a PDCCH being scheduled and improving the reliability of transmitting the PDCCH.

Figure 7:
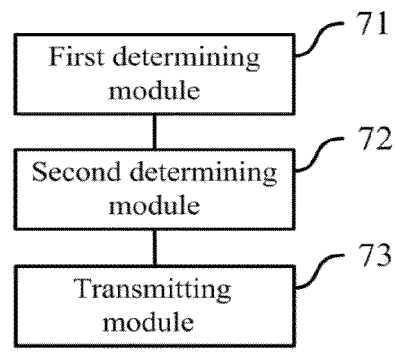
FIG. 7 is a schematic structural diagram of a base station according to an embodiment of the invention.

In order to implement the foregoing technical solution, FIG. 7 illustrates a schematic structural diagram of a base station according to an embodiment of the invention, which includes:

a first determining module 71 configured to determine CI information; and a second determining module 72 connected with the first determining module 71 and configured to determine different search spaces corresponding to different PDCCHs according to the CI information determined by the first determining module 71.

Furthermore, the first determining module 71 is configured to determine the CI information according to information in a DCI field.

Furthermore, the base station further includes:

a transmitting module 73 connected with the second determining module 72 and configured to transmit the different PDCCHs to a corresponding user equipment in the different search spaces determined by the second determining module 72.

In a specific application scenario, the second determining module 72 is constituted in one of the following three schemes in correspondence to the different schemes in which the different search spaces corresponding to the different PDCCHs are determined.

Figure 8:
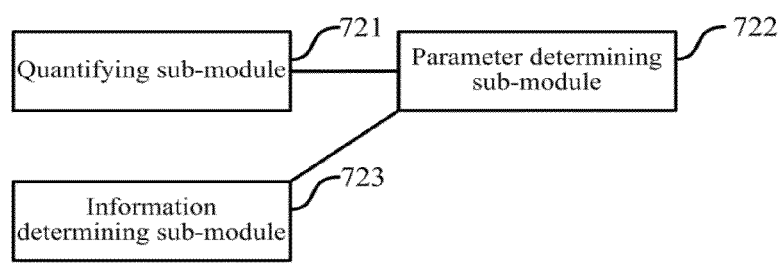
FIG. 8 is a schematic structural diagram of a second determination module in an application scenario according to an embodiment of the invention.

In a first scheme, the second determining module 72 is constituted of the following sub-modules as illustrated in FIG. 8 in the scenario where the CI information is introduced in determining starting parameters of the search spaces corresponding to the respective PDCCHs to thereby determine the different search spaces:

a quantifying sub-module 721 configured to quantify the CI information determined by the first determining module 71;

a parameter determining sub-module 722 connected with the quantifying sub-module 721 and configured to determine starting parameters of the search spaces corresponding to the respective PDCCHs according to the CI information of the respective PDCCHs quantified by the quantifying sub-module 721; and an information determining sub-module 723 connected with the parameter determining sub-module 722 and configured to determine CCE information according to the starting parameters of the search spaces determined by the parameter determining sub-module 722.

Figure 9:
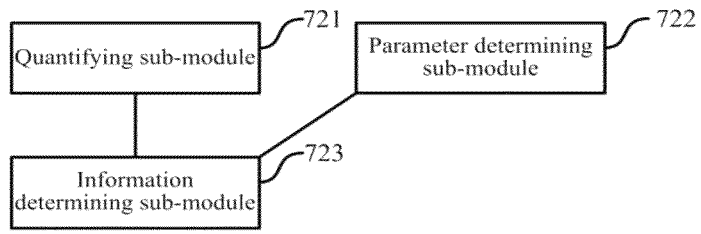
FIG. 9 is a schematic structural diagram of the second determination module in another application scenario according to an embodiment of the invention.

In a second scheme, the second determining module 72 is constituted of the following sub-modules as illustrated in FIG. 9 in the scenario where the CI information is introduced in determining the CCE information corresponding to the respective PDCCHs to thereby determine the different search spaces:

a quantifying sub-module 721 configured to quantify the CI information determined by the first determining module 71;

a parameter determining sub-module 722 configured to determine starting parameters of the search spaces; and an information determining sub-module 723 connected with the quantifying sub-module 721 and the parameter determining sub-module 722 and configured to determine CCE information corresponding to the respective PDCCHs according to the CI information of the respective PDCCHs quantified by the quantifying sub-module 721 and the starting parameters of the search spaces determined by the parameter determining sub-module 722.

Figure 10:
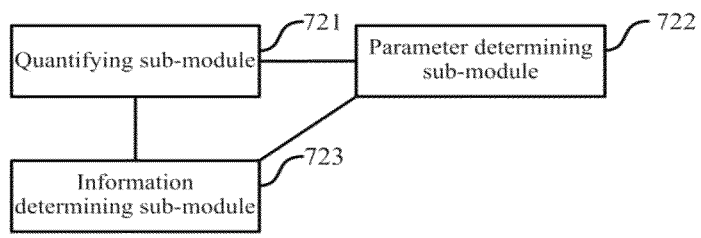
FIG. 10 is a schematic structural diagram of the second determination module in another application scenario according to an embodiment of the invention.

In a third scheme, the second determining module 72 is constituted of the following sub-modules as illustrated in FIG. 10 in the scenario where the CI information is introduced in determining both the starting parameters of the search spaces and the CCE information corresponding to the respective PDCCHs to thereby determine the different search spaces:

a quantifying sub-module 721 configured to quantify the CI information determined by the first determining module 71;

a parameter determining sub-module 722 connected with the quantifying sub-module 721 and configured to determine starting parameters of the search spaces corresponding to the respective PDCCHs according to the CI information of the respective PDCCHs quantified by the quantifying sub-module 721; and an information determining sub-module 723 connected with the quantifying sub-module 721 and the parameter determining sub-module 722 and configured to determine CCE information corresponding to the respective PDCCHs according to the CI information of the respective PDCCHs quantified by the quantifying sub-module 721 and the starting parameters of the search spaces determined by the parameter determining sub-module 722.

Figure 11:
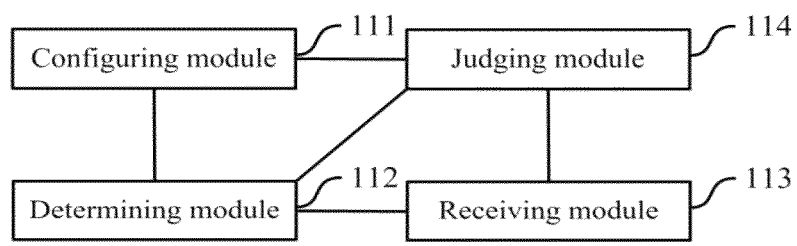
FIG. 11 is a schematic structural diagram of a user equipment according to an embodiment of the invention.

In another aspect, FIG. 11 illustrates a schematic structural diagram of a user equipment according to an embodiment of the invention, which includes a configuring module 111 and a determining module 112.

The configuring module 111 is configured to configure preset information including at least $n_{CI}$ information according to information transmitted from the network side.

In a specific application scenario, the preset information is information with which the user equipment is configured directly from the network side and which can include $n_{CI}$ ($n_{CI}$ refers to the number of a carrier configured from the network side for the user equipment to receive, $\{n_{CI}\}$ is the maximum set of the numbers of carriers configured from the network side for the user equipment to receive), $n_{RNTI}$ and $n_s$.

The determining module 112 is configured to determine search spaces of PDCCHs over respective received downlink carriers according to the $n_{CI}$ information in the preset information configured by the configuring module 111 and a strategy applied at the network side to determine the different search spaces corresponding to the different PDCCHs.

Furthermore, the user equipment further includes:

a receiving module 113 configured to receive PDCCHs corresponding to the user equipment in the respective search spaces determined by the determining module 112.

In a specific application scenario, the user equipment further includes the following module in a scheme where CI information corresponding to the user equipment is acquired by comparing the CI information and the corresponding PDCCHs are acquired.

A judging module 114 is configured to acquire the PDCCH in each of the search spaces determined by the determining module 112 and judge whether CI information included over the PDCCH is consistent with the $n_{CI}$ information in the preset information configured by the configuring module 111, and if not, continue with judging whether CI information included over another PDCCH is consistent with the $n_{CI}$ information in the preset information configured by the configuring module 111 until judgment is made for all the PDCCHs over the respective search spaces over the respective downlink carriers.

The receiving module 113 is further configured to receive the PDCCH in the corresponding search space according to the CI information when the result of judgment by the judging module 114 shows consistency.

The embodiments of the invention have the following advantages over the prior art.

With the technical solution according to the embodiments of the invention, CI information is introduced in determining a search space so that different search spaces can be allocated to across-carrier PDCCHs of a user equipment to enable a base station and the user equipment to determine accurately the search spaces of the PDCCHs over respective downlink carriers, thereby lowering the probability of blocking a PDCCH being scheduled and improving the reliability of transmitting the PDCCH.

Those skilled in the art can clearly appreciate from the foregoing descriptions of the embodiments that the invention can be implemented in hardware or in software plus a necessary general hardware platform. Based upon such understanding, the technical solution of the invention can be embodied in the form of a software product which can be stored in a nonvolatile storage medium (e.g., a CD-ROM, a U-disk, a mobile hard disk, etc.) and which includes several instructions to cause a computer device (e.g., a personal computer, a server, a network device, etc.) to perform the method according to the respective embodiments of the invention.

Those skilled in the art can appreciate that the drawings are merely a schematic diagram of a preferred embodiment, and the module(s) or the flow(s) may not necessarily be required to implement the embodiments of the invention.

Those skilled in the art can appreciate that the modules in the devices of the embodiments can be distributed in the devices of the embodiments as described in the embodiments or located in one or more devices different from those of the embodiments given corresponding variations. The modules of the foregoing embodiments can be combined into one module or further divided into a plurality of sub-modules.

The embodiments of the invention have been numbered only for the sake of a convenient description but will not represent any superiority of one embodiment to another.

The foregoing disclosure is merely illustrative of several embodiments of the invention, but the invention will not be limited thereto, and any variations that can occur to those skilled in the art shall come into the scope of the invention.

The invention claimed is:

1. A method for transmitting Physical Downlink Control Channel, PDCCH, information, comprising:

determining, by a base station, different search spaces corresponding to different PDCCHs according to Carrier Indicator, CI, information; and transmitting, by the base station, the different PDCCHs to a corresponding user equipment in the corresponding search spaces, wherein determining by the base station the different search spaces corresponding to the different PDCCHs according to the CI information comprises:

determining, by the base station, starting parameters of the search spaces corresponding to the respective PDCCHs according to the CI information of the respective PDCCHs; and determining, by the base station, Control Channel Element, CCE, information according to the starting parameters of the search spaces, and wherein the base station determines the starting parameters of the search spaces corresponding to the respective PDCCHs according to the CI information of the respective PDCCHs in the formula of:

$$Y_k = (A(Y_{k-1} + p * n_{CI})) \bmod D,$$

wherein $Y_k$ represents the starting parameters of the search spaces corresponding to the respective PDCCHs, $n_{CI}$ represents a decimal numerical value corresponding to the CI information, p represents an integer which is set in a system, $Y_{-1} = n_{RNTI} \neq 0$, $A = 39827$, $D = 65537$, $k = \lfloor n_s/2 \rfloor$, and $n_s$ represents the number of a timeslot in a radio frame;

or wherein determining by the base station the different search spaces corresponding to the different PDCCHs according to the CI information comprises:

determining, by the base station, starting parameters of the search spaces corresponding to the respective PDCCHs; and determining, by the base station, CCE information corresponding to the respective PDCCHs according to the CI information and the starting parameters of the search spaces of the respective PDCCHs, and wherein the base station determines the CCE information corresponding to the respective PDCCHs according to the CI information and the starting parameters of the search spaces of the respective PDCCHs in the formula of:

$$L \cdot \{(Y_k + p^* n_{CI} + m) \bmod \lfloor N_{CCE,k}/L \rfloor\} + i,$$

wherein $Y_k$ represents the starting parameters of the search spaces corresponding to the respective PDCCHs, $n_{CI}$ represents a decimal numerical value corresponding to the CI information, p represents an integer which is set in a system, i=0, 1, ..., L−1, m=0, 1, ..., $M^L$−1, L represents an aggregation level, and $M^L$ represents the size of a search space corresponding to the aggregation level L;

or wherein determining by the base station the different search spaces corresponding to the different PDCCHs according to the CI information comprises:

determining, by the base station, starting parameters of the search spaces corresponding to the respective PDCCHs according to the CI information of the respective PDCCHs; and determining, by the base station, CCE information corresponding to the respective PDCCHs according to the CI information and the starting parameters of the search spaces of the respective PDCCHs, and wherein the base station determines the starting parameters of the search spaces corresponding to the respective PDCCHs according to the CI information of the respective PDCCHs in the formula of:

$$Y_k = (A(Y_{k-1} + p^* n_{CI})) \bmod D,$$

wherein $Y_k$ represents the starting parameters of the search spaces corresponding to the respective PDCCHs, $n_{CI}$ represents a decimal numerical value corresponding to the CI information, p represents an integer which is set in a system, $Y_{-1} = n_{RNTI} \neq 0$,

A=39827,

D=65537, k=$\lfloor n_s/2 \rfloor$, and $n_s$ represents the number of a timeslot in a radio frame; and the base station determines the CCE information corresponding to the respective PDCCHs according to the CI information and the starting parameters of the search spaces of the respective PDCCHs in the formula of:

$$L \cdot \{(Y_k + p^* n_{CI} + m) \bmod \lfloor N_{CCE,k}/L \rfloor\} + i,$$

wherein $Y_k$ represents the starting parameters of the search spaces corresponding to the respective PDCCHs, $n_{CI}$ represents a decimal numerical value corresponding to the CI information, p represents an integer which is set in a system, i=0, 1, ..., L−1, m=0, 1, ..., $M^L$−1, L represents an aggregation level, and $M^L$ represents the size of a search space corresponding to the aggregation level L.

2. The method according to claim 1, wherein determining by the base station the different search spaces corresponding to the different PDCCHs according to the CI information comprises:

determining, by the base station, the CI information; and determining, by the base station, the different search spaces corresponding to the different PDCCHs according to the CI information.

3. The method according to claim 2, wherein determining by the base station the CI information comprises:

determining, by the base station, the CI information according to information in a Downlink Control Information, DCI, field.

4. A method for determining a search space of a Physical Downlink Control Channel, PDCCH, comprising:

determining, by a base station, Carrier Indicator, CI, information; and determining, by the base station, different search spaces corresponding to different PDCCHs according to the CI information, wherein determining by the base station the different search spaces corresponding to the different PDCCHs according to the CI information comprises:

determining, by the base station, starting parameters of the search spaces corresponding to the respective PDCCHs according to the CI information of the respective PDCCHs; and determining, by the base station, Control Channel Element, CCE, information according to the starting parameters of the search spaces, and wherein the base station determines the starting parameters of the search spaces corresponding to the respective PDCCHs according to the CI information of the respective PDCCHs in the formula of:

$$Y_k = (A(Y_{k-1} + p^* n_{CI})) \bmod D,$$

wherein $Y_k$ represents the starting parameters of the search spaces corresponding to the respective PDCCHs, $n_{CI}$ represents a decimal numerical value corresponding to the CI information, p represents an integer which is set in a system, $Y_{-1} = n_{RNTI} \neq 0$,

A=39827,

D=65537, k=$\lfloor n_s/2 \rfloor$, and $n_s$ represents the number of a timeslot in a radio frame;

or wherein determining by the base station the different search spaces corresponding to the different PDCCHs according to the CI information comprises:

determining, by the base station, starting parameters of the search spaces corresponding to the respective PDCCHs; and determining, by the base station, CCE information corresponding to the respective PDCCHs according to the CI information and the starting parameters of the search spaces of the respective PDCCHs, and wherein the base station determines the CCE information corresponding to the respective PDCCHs according to the CI information and the starting parameters of the search spaces of the respective PDCCHs in the formula of:

$$L \cdot \{(Y_k + p^* n_{CI} + m) \bmod \lfloor N_{CCE,k}/L \rfloor\} + i,$$

wherein $Y_k$ represents the starting parameters of the search spaces corresponding to the respective PDCCHs, $n_{CI}$ represents a decimal numerical value corresponding to the CI information, p represents an integer which is set in a system, i=0, 1, . . . , L−1, m=0, 1, . . . , $M^L$−1, L represents an aggregation level, and $M^L$ represents the size of a search space corresponding to the aggregation level L;

or wherein determining by the base station the different search spaces corresponding to the different PDCCHs according to the CI information comprises:

determining, by the base station, starting parameters of the search spaces corresponding to the respective PDCCHs according to the CI information of the respective PDCCHs; and determining, by the base station, CCE information corresponding to the respective PDCCHs according to the CI information and the starting parameters of the search spaces of the respective PDCCHs, and wherein the base station determines the starting parameters of the search spaces corresponding to the respective PDCCHs according to the CI information of the respective PDCCHs in the formula of:

$$Y_k = (A(Y_{k-1} + p^* n_{CI})) \bmod D,$$

wherein $Y_k$ represents the starting parameters of the search spaces corresponding to the respective PDCCHs, $n_{CI}$ represents a decimal numerical value corresponding to the CI information, p represents an integer which is set in a system, $Y_{-1} = n_{RNTI} \neq 0$,

A=39827,

D=65537, k=$\lfloor n_s/2 \rfloor$, and $n_s$ represents the number of a timeslot in a radio frame; and the base station determines the CCE information corresponding to the respective PDCCHs according to the CI information and the starting parameters of the search spaces of the respective PDCCHs in the formula of:

$$L \cdot \{(Y_k + p^* n_{CI} + m) \bmod \lfloor N_{CCE,k}/L \rfloor\} + i,$$

wherein $Y_k$ represents the starting parameters of the search spaces corresponding to the respective PDCCHs, $n_{CI}$ represents a decimal numerical value corresponding to the CI information, p represents an integer which is set in a system, i=0, 1, . . . , L−1, m=0, 1, . . . , $M^L$−1, L represents an aggregation level, and $M^L$ represents the size of a search space corresponding to the aggregation level L.

5. The method according to claim 4, wherein determining by the base station the CI information comprises:

determining, by the base station, the CI information according to information in a Downlink Control Information, DCI, field.

6. A method for determining a search space of a Physical Downlink Control Channel, PDCCH, comprising:

determining, by a user equipment, search spaces of PDCCHs over respective received downlink carriers according to $n_{CI}$ information in preset information and a strategy applied at the network side to determine different search spaces corresponding to different PDCCHs, wherein the strategy applied at the network side to determine the different search spaces corresponding to the different PDCCHs comprises:

determining, by a base station, starting parameters of the search spaces corresponding to the respective PDCCHs according to CI information of the respective PDCCHs; and determining, by the base station, Control Channel Element, CCE, information according to the starting parameters of the search spaces, and wherein the base station determines the starting parameters of the search spaces corresponding to the respective PDCCHs according to the CI information of the respective PDCCHs in the formula of:

$$Y_k = (A(Y_{k-1} + p^* n_{CI})) \bmod D,$$

wherein $Y_k$ represents the starting parameters of the search spaces corresponding to the respective PDCCHs, $n_{CI}$ represents a decimal numerical value corresponding to the CI information, p represents an integer which is set in a system, $Y_{-1} = n_{RNTI} \neq 0$,

A=39827,

D=65537, k=$\lfloor n_s/2 \rfloor$, and $n_s$ represents the number of a timeslot in a radio frame;

or wherein the strategy applied at the network side to determine the different search spaces corresponding to the different PDCCHs comprises:

determining, by a base station, starting parameters of the search spaces corresponding to the respective PDCCHs; and determining, by the base station, CCE information corresponding to the respective PDCCHs according to CI information and the starting parameters of the search spaces of the respective PDCCHs, and wherein the base station determines the CCE information corresponding to the respective PDCCHs according to the CI information and the starting parameters of the search spaces of the respective PDCCHs in the formula of:

$$L \cdot \{(Y_k + p^* n_{CI} + m) \bmod \lfloor N_{CCE,k}/L \rfloor\} + i,$$

wherein $Y_k$ represents the starting parameters of the search spaces corresponding to the respective PDCCHs, $n_{CI}$ represents a decimal numerical value corresponding to the CI information, p represents an integer which is set in a system, i=0, 1, . . . , L−1, m=0, 1, . . . , $M^L$−1, L represents an aggregation level, and $M^L$ represents the size of a search space corresponding to the aggregation level L;

or wherein the strategy applied at the network side to determine the different search spaces corresponding to the different PDCCHs comprises:

determining, by a base station, starting parameters of the search spaces corresponding to the respective PDCCHs according to CI information of the respective PDCCHs; and determining, by the base station, CCE information corresponding to the respective PDCCHs according to the CI information and the starting parameters of the search spaces of the respective PDCCHs, and wherein the base station determines the starting parameters of the search spaces corresponding to the respective PDCCHs according to the CI information of the respective PDCCHs in the formula of:

$$Y_k = (A(Y_{k-1} + p^* n_{CI})) \bmod D,$$

wherein $Y_k$ represents the starting parameters of the search spaces corresponding to the respective PDCCHs,
$n_{CI}$ represents a decimal numerical value corresponding to the CI information,
p represents an integer which is set in a system,
$Y_{-1}=n_{RNTI}\neq 0$,
A=39827,
D=65537,
$k=\lfloor n_s/2 \rfloor$, and
$n_s$ represents the number of a timeslot in a radio frame; and
the base station determines the CCE information corresponding to the respective PDCCHs according to the CI information and the starting parameters of the search spaces of the respective PDCCHs in the formula of:

$$L \cdot \{(Y_k+p*n_{CI}+m) \mod \lfloor N_{CCE,k}/L \rfloor\}+i,$$

wherein $Y_k$ represents the starting parameters of the search spaces corresponding to the respective PDCCHs,
$n_{CI}$ represents a decimal numerical value corresponding to the CI information,
p represents an integer which is set in a system,
i=0, 1, ..., L-1,
m=0, 1, ..., $M^L$-1,
L represents an aggregation level, and
$M^L$ represents the size of a search space corresponding to the aggregation level L.

7. The method according to claim 6, further comprising:
after determining by the user equipment the search spaces of the PDCCHs over the respective received downlink carriers according to the $n_{CI}$ information in the preset information and the strategy applied at the network side to determine the different search spaces corresponding to the different PDCCHs,
receiving, by the user equipment, PDCCHs corresponding to the user equipment in the respective determined search spaces.

8. The method according to claim 7, wherein receiving by the user equipment the PDCCHs corresponding to the user equipment in the respective determined search spaces comprises:
acquiring, by the user equipment, a PDCCH in each of the determined search spaces and judging whether Carrier Indicator, CI, information comprised over the PDCCH is consistent with the $n_{CI}$ information in the preset information; and
if so, receiving, by the user equipment, the PDCCH in the corresponding search space according to the CI information; otherwise, continuing, by the user equipment, with acquiring another PDCCH and judging whether CI information comprised over the another PDCCH is consistent with the $n_{CI}$ information in the preset information until judgment is made for all the PDCCHs in the respective search spaces over the respective downlink carriers.

9. A user equipment, comprising a physical storage medium that stores program code, wherein the program code is executable to implement:
a configuring module configured to configure preset information comprising at least $n_{CI}$ information according to information transmitted from the network side; and
a determining module configured to determine search spaces of Physical Downlink Control Channels, PDCCHs, over respective received downlink carriers according to the $n_{CI}$ information in the preset information configured by the configuring module and a strategy applied at the network side to determine different search spaces corresponding to different PDCCHs, wherein the strategy applied at the network side to determine the different search spaces corresponding to the different PDCCHs comprises:
determining, by a base station, starting parameters of the search spaces corresponding to the respective PDCCHs according to CI information of the respective PDCCHs; and
determining, by the base station, Control Channel Element, CCE, information according to the starting parameters of the search spaces,
and wherein the base station determines the starting parameters of the search spaces corresponding to the respective PDCCHs according to the CI information of the respective PDCCHs in the formula of:

$$Y_k=(A(Y_{k-1}+p*n_{CI})) \mod D,$$

wherein $Y_k$ represents the starting parameters of the search spaces corresponding to the respective PDCCHs,
$n_{CI}$ represents a decimal numerical value corresponding to the CI information,
p represents an integer which is set in a system,
$Y_{-1}=n_{RNTI}\neq 0$,
A=39827,
D=65537,
$k=\lfloor n_s/2 \rfloor$, and
$n_s$ represents the number of a timeslot in a radio frame;
or
wherein the strategy applied at the network side to determine the different search spaces corresponding to the different PDCCHs comprises:
determining, by a base station, starting parameters of the search spaces corresponding to the respective PDCCHs; and
determining, by the base station, CCE information corresponding to the respective PDCCHs according to CI information and the starting parameters of the search spaces of the respective PDCCHs,
and wherein the base station determines the CCE information corresponding to the respective PDCCHs according to the CI information and the starting parameters of the search spaces of the respective PDCCHs in the formula of:

$$L \cdot \{(Y_k+p*n_{CI}+m) \mod \lfloor N_{CCE,k}/L \rfloor\}+i,$$

wherein $Y_k$ represents the starting parameters of the search spaces corresponding to the respective PDCCHs,
$n_{CI}$ represents a decimal numerical value corresponding to the CI information,
p represents an integer which is set in a system,
i=0, 1, ..., L-1,
m=0, 1, ..., $M^L$-1,
L represents an aggregation level, and
$M^L$ represents the size of a search space corresponding to the aggregation level L;
or
wherein the strategy applied at the network side to determine the different search spaces corresponding to the different PDCCHs comprises:
determining, by a base station, starting parameters of the search spaces corresponding to the respective PDCCHs according to CI information of the respective PDCCHs; and
determining, by the base station, CCE information corresponding to the respective PDCCHs according to the CI information and the starting parameters of the search spaces of the respective PDCCHs, and wherein the base station determines the starting parameters of the search spaces corresponding to the respective PDCCHs according to the CI information of the respective PDCCHs in the formula of:

$$Y_k = (A(Y_{k-1} + p^* n_{CI})) \bmod D,$$

wherein $Y_k$ represents the starting parameters of the search spaces corresponding to the respective PDCCHs,
$n_{CI}$ represents a decimal numerical value corresponding to the CI information,
p represents an integer which is set in a system,
$Y_{-1} = n_{RNTI} \neq 0$,
A=39827,
D=65537,
$k = \lfloor n_s/2 \rfloor$, and
$n_s$ represents the number of a timeslot in a radio frame; and
the base station determines the CCE information corresponding to the respective PDCCHs according to the CI information and the starting parameters of the search spaces of the respective PDCCHs in the formula of:

$$L \cdot \{(Y_k + p^* n_{CI} + m) \bmod \lfloor N_{CCE,k}/L \rfloor\} + i,$$

wherein $Y_k$ represents the starting parameters of the search spaces corresponding to the respective PDCCHs,
$n_{CI}$ represents a decimal numerical value corresponding to the CI information,
p represents an integer which is set in a system,
i=0, 1, . . . , L−1,
m=0, 1, . . . , $M^L$−1,
L represents an aggregation level, and
$M^L$ represents the size of a search space corresponding to the aggregation level L.

10. The user equipment according to claim 9, wherein the program code stored in the physical storage medium is executable to further implement:
a receiving module configured to receive PDCCHs corresponding to the user equipment in the respective search spaces determined by the determining module.

11. The user equipment according to claim 10, wherein the program code stored in the physical storage medium is executable to further implement:
a judging module configured to acquire a PDCCH in each of the search spaces determined by the determining module and judge whether Carrier Indicator, CI, information comprised over the PDCCH is consistent with the $n_{CI}$ information in the preset information configured by the configuring module, and if not, continue with judging whether CI information comprised over another PDCCH is consistent with the $n_{CI}$ information in the preset information configured by the configuring module until judgment is made for all the PDCCHs in the respective search spaces over the respective downlink carriers; and
the receiving module is further configured to receive the PDCCH in the corresponding search space according to the CI information when the result of judgment by the judging module shows consistency.

* * * * *